US005288049A

United States Patent [19]

Hays

[11] Patent Number: 5,288,049

[45] Date of Patent: Feb. 22, 1994

[54] SECURED MONITOR MOUNTING BRACKET

[76] Inventor: Robert E. Hays, 245 Trails End Rd., Elkhorn, Nebr. 68022

[21] Appl. No.: 959,642

[22] Filed: Oct. 13, 1992

[51] Int. Cl.[5] ............ F16M 13/00

[52] U.S. Cl. ............ 248/298; 248/674; 248/917; 312/7.2

[58] Field of Search ............ 248/298, 917, 225.1, 248/222.4, 224.4, 317, 637, 674, 224.2, 309.1; 312/223.1, 7.2, 245

[56] References Cited

U.S. PATENT DOCUMENTS

| | | | |
|---|---|---|---|
| 3,497,281 | 2/1970 | Wilde . | |
| 4,097,012 | 6/1978 | McIntyre | 248/674 |
| 4,613,109 | 9/1986 | Boscacci | 248/298 |
| 4,964,018 | 10/1990 | Mallory et al. . | |
| 4,993,676 | 2/1991 | Fitts et al. | 248/917 |
| 5,007,608 | 4/1991 | Carroll, Jr. | 248/917 |
| 5,131,620 | 7/1992 | Boundy | 248/225.1 |

OTHER PUBLICATIONS

"School Bus TV", Washington Post, Jan. 25, 1970.

*Primary Examiner*—Richard K. Seidel
*Assistant Examiner*—Hwei-Siu Payer
*Attorney, Agent, or Firm*—Richard C. Litman

[57] ABSTRACT

A monitor and bracket system allows for the secure placement of the monitor within a vehicle. The monitor is slid onto a bracket attached to the top of the interior of the vehicle or to an overhead luggage compartment within the vehicle. The monitor is for allowing passengers to view pre-recorded programs, such as movies or tour guide information. Once the monitor is slide into the bracket, a back portion is attached to the back of the monitor to prevent the monitor from sliding out of the bracket. A lock on the back portion of the monitor is used to engage a bolt with a notch in the top of the monitor. In this way, the monitor may not be removed from the bracket unless the lock turned to remove the bolt from the notch.

8 Claims, 2 Drawing Sheets

5

57
51
29
55
33
59
31
53

7
25

61
41

13
19
41

SECURED MONITOR MOUNTING BRACKET

BACKGROUND OF THE INVENTION

1. Field of the Invention

The present invention relates to monitor brackets for attaching a monitor within a vehicle. More particularly, the present invention pertains to those monitors and monitor brackets which utilize a lock to prevent the theft of the monitor from the vehicle once the monitor bracket is securely attached to the vehicle and the monitor is slide into the bracket.

2. Description of the Prior Art

U.S. Pat. No. 3,497,281 issued Feb. 24, 1970 to Leon G. Wilde discloses modular enclosures for mounting laboratory equipment such as a voltmeter or oscilloscope.

U.S. Pat. No. 4,964,018 discloses a display module which is removable from the electric instrument it is associated with.

None of the above inventions and patents, taken either singly or in combination, is seen to describe the instant invention as claimed.

SUMMARY OF THE INVENTION

In the present invention, a slide bracket is mounted to the roof or luggage compartment within the interior of a vehicle. The slide bracket is a rectangular plate with two downward protruding side walls and two opposing flanges extending towards the center of the plate from the bottom of the downward protruding side walls. The slide bracket has holes through the rectangular plate to allow it to be screwed onto a top surface portion of the vehicle's interior. A monitor is designed with a top which can slide from the front end of the slide bracket to the back end of the slide bracket, where external connectors are connected to receptors for supplying the monitor with a video signal, an audio signal, and power.

The monitor of the preferred embodiment is designed with a rectangular top which can connect to the slide bracket. The top of the monitor has a front side which is attached to the top portion of the front of the monitor. The right side edge of the top is not connected to the right side of the monitor so as to allow the downward protruding side wall on the right side of the slide bracket to enter the gap therebetween. Likewise, the left side edge has a gap between it and the left side of the monitor. The back portion of the top of the monitor has a downward protruding back wall extending a short distance down from the edge of the top with slots in the corners thereof for allowing the two opposing flanges to enter therethrough. The sides of the back portion are connected to the side walls of the monitor to secure the back portion of the top of the monitor as the back end is slide into the front of the slide bracket.

As stated above, external connectors are located in the back of the slide bracket. The external connectors are located within a box which is attached to the bottom portion of the slide bracket. Located at the back end of the top is a recessed portion into which the box can enter. Within the recessed portion are male connectors which connect up to female connector within the box as the monitor is slide into the slide bracket. These connection provide the necessary power and external signals to operate the monitor. Once the monitor is slide all the way to the back of the slide bracket so as to make all the necessary connection, a back portion is attached to the monitor. The back portion of the monitor has a lock so as to engage the top of the monitor. This prevents the monitor from being removed from the slide bracket by unauthorized personnel. Further, the top of the left and right side walls extend beyond the top of the monitor to prevent tampering with the side walls of the slide bracket.

Accordingly, it is a principal object of the invention to provide a means for mounting a monitor within a vehicle which can be easily slide into and removed from a bracket attached to a portion of the interior of the vehicle.

It is another object of the invention to provide a monitor bracket in which all power and input signal sources are automatically connected when the monitor is slide into the bracket.

It is a further object of the invention to provide a lock for securely attaching the monitor to the slide bracket.

Still another object of the invention is to provide monitor side walls which extend beyond the top of the monitor so as to prevent tampering with the slide bracket.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The monitor and bracket system 1 of the present invention is for mounting to the interior portion of a vehicle, such as a bus, for providing video information and entertainment to the passengers. In the preferred embodiment, the monitor 3 is for providing video taped programs to passengers of a bus. The video taped programs could be tour guide information if the bus is a tour bus or simply movies.

Figure 1:
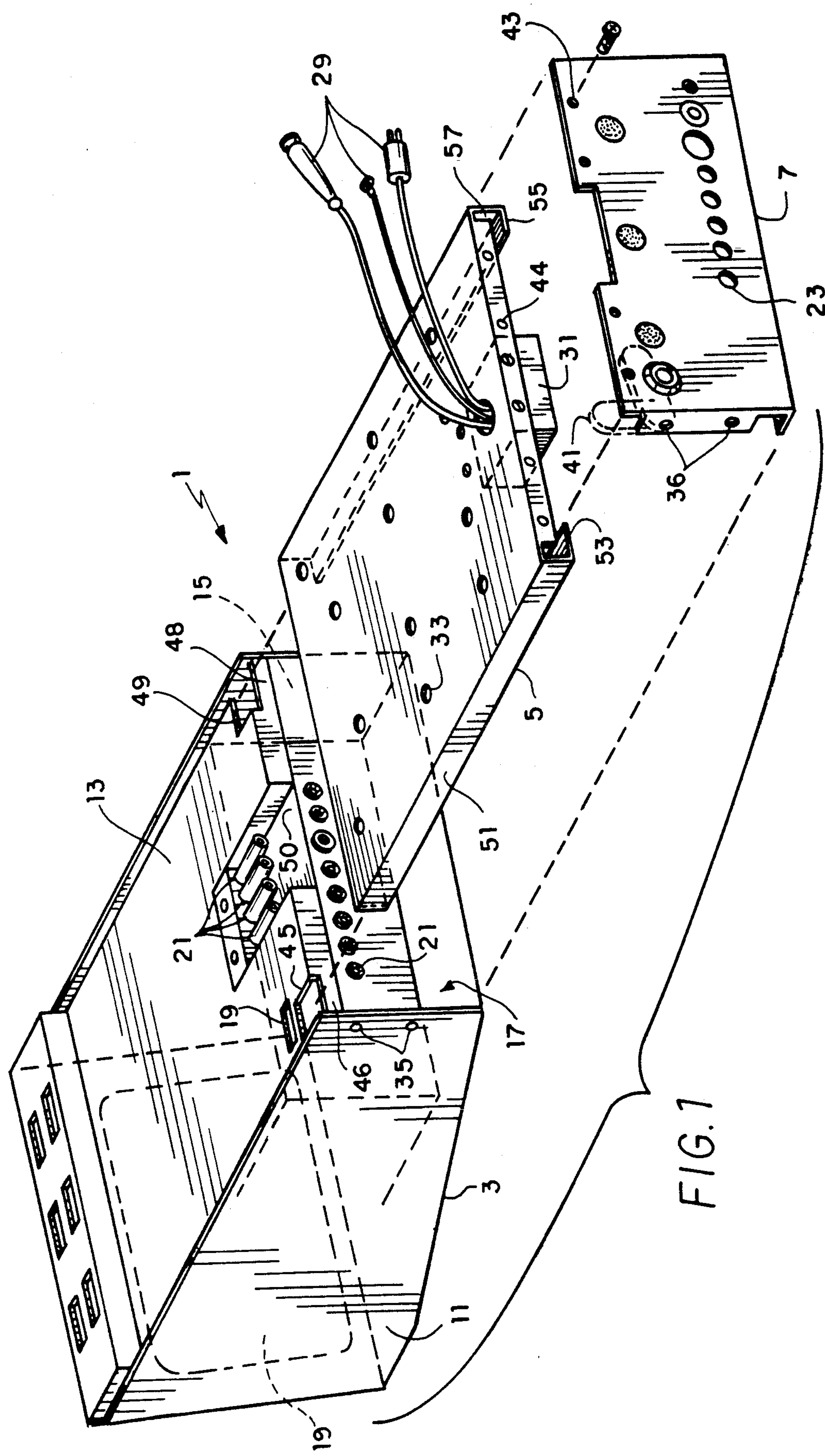
FIG. 1 is an exploded perspective view of the video monitor and bracket system of the present invention.

The bracket 5, as shown in FIG. 1, is designed to be mounted to the top of the interior of the vehicle or to an overhead luggage compartment within the vehicle. Screw holes 33 are provide to allow the screws to be inserted therethrough from the underside of the bracket 5. In this manner the bracket 5 is rigidly secured to the top of the vehicle or luggage compartment. Line connections 29 are provided which are to be wired to a power supply and the audio and video outputs of the video player.

The bracket 5 has a rectangular top plate through which the holes 33 are drilled. A downward protruding left side wall 51 has a rectangular flange 53 extending inwardly from the bottom edge of the wall 51. A rectangular flange 55 extends inwardly from the bottom edge of the downward protruding right side wall 57. The flanges are for engaging the underneath side of the top 13 of the monitor so as to suspend the monitor to the top portion of the vehicle the bracket 5 is attached to.

The monitor 3 of the system 1 has a video display 9 located on the front end. The top portion 13 is attached to the front end of the monitor 3 and extends to the back open end 17. The top 13 does not come into contact with either the left side wall 11 or the right side wall 15 of the monitor 3. A back portion of the top 13 has a back wall 47 extending downward a predetermined distance from the edge of the back portion. Left and right extensions 46 and 48 extend laterally to attach to the side walls 11 and 15, respectively. The extensions 46 and 48 provide support for the back end of the top 13 so as to suspend the monitor from the top of the vehicle when the top 13 is slide onto the bracket 5 attached to the top of the vehicle.

A left side notch 45 and a right side notch 49 are formed between the back edge of the top and the extensions 46 and 48, respectively. These notches allow the flanges to be inserted underneath the top 13. The left and right gaps formed between the left and right edges of the top 13 and the left and right side walls 11 and 15, respectively, allow the left and right downward protruding side walls 51 and 57 to slide to the front end of the monitor 3 as the monitor 3 is slide onto the bracket 5. In this manner the flanges 53 and 55 engage an underneath section of the top 13 from the back end to the front end of the top 13 of the monitor 3.

A recessed portion 50 is located in the middle of the back wall 47 half way between the side walls 11 and 15. External connector extensions 21 are located within the recessed portion 50. As the front of the bracket 5 is slide onto the monitor 3 over the top 13 as discussed above, the external connector extensions 21 form electrical connections with connector receivers within the box 31 connected in the middle of the back end of the bracket 5.

Figure 2:
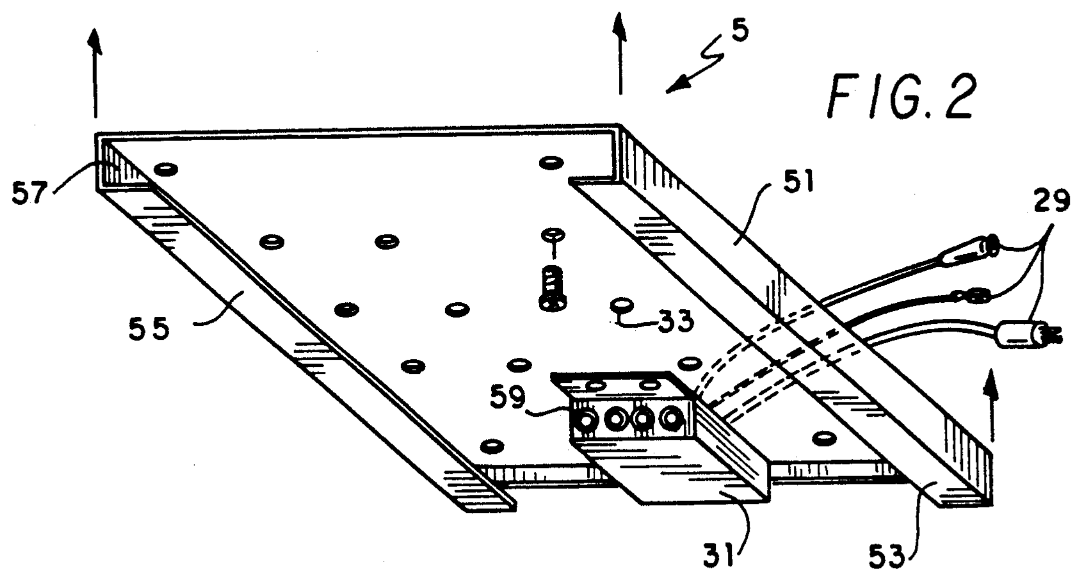
FIG. 2 is a perspective view of the bracket of the present invention.

The connector receivers 59, see FIG. 2, form electrical connections with wires 29 which in turn form electrical connections with a power source, the video signal source, and the audio signal source. In this manner, once the external connector extensions make electrical connection with the connector receivers 59, the video monitor 3 receives the necessary power, audio signal, and video signal it needs to operate.

Once the monitor 3 is slide into the bracket 5 so as to make the necessary electrical connections, a back portion 7 is placed over the back open end 17 of the monitor 3. As shown in FIG. 1, the back portion 7 has screw holes 36 which match up with screw holes 35 for fastening the back portion 7 to the monitor 3. On the right side of the back portion and monitor are similar holes which function in a like manner. On the front of the back portion 7 are screw holes 43 which match up with screw holes 44 to fasten the back portion 7 to the bracket 5. Velcro attachments 27 are attached to the front of the back portion 7 so that cloth may be placed over the back end of the monitor to make it more aesthetically appealing. Holes 23 through the back portion 7 allow technicians to adjust the monitors working parameter by adjusting variable elements 21, e.g., vertical hold, contrast, etc.

Figure 3:
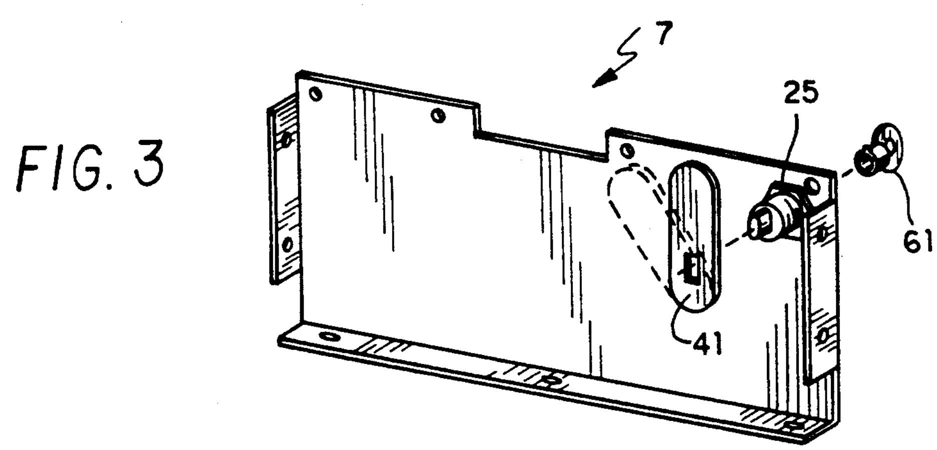
FIG. 3 is a perspective view of the back portion of said monitor.
Figure 4:
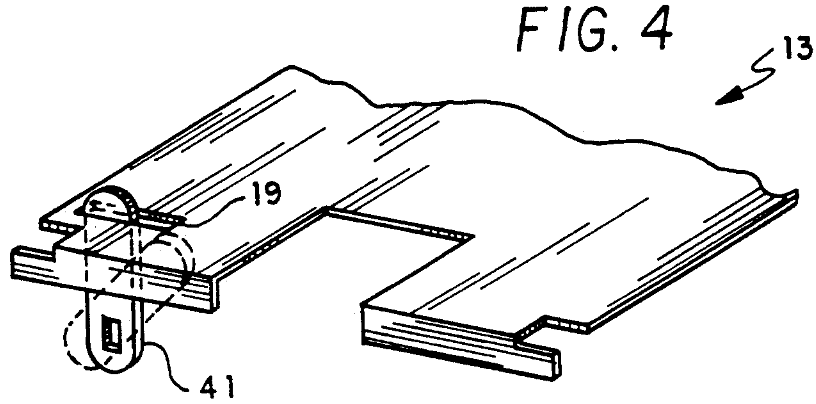
FIG. 4 is a perspective partial view of the top portion of the monitor illustrating the engagement between the rotatable lip of the lock and the notch located on the top portion of the monitor.

A key lock 25 is also attached to the back portion 7 in order to prevent unauthorized removal of the monitor from the vehicle. A key 61 is provided which will turn the cylinder of the lock 25 in the conventional manner so as to rotate the bolt 41 attached to the cylinder of the lock 25 (see FIG. 3). As shown in FIGS. 1 and 4, the top 13 has a notch 19 through which the bolt 41 enters when rotated so as to the vertical along its length. However, if the bolt 41 is rotated so as to be horizontal along its length, the bolt 41 will not engage the notch 19. In this manner, the back portion 7 can be locked to the monitor so as to prevent unauthorized removal of the monitor 3 from the bracket 5.

As shown in FIG. 1, the side walls 11 and 15 extend upward beyond the top 13 so as to cover up the downward protruding side walls 51 and 57 when the monitor 3 is attached to the bracket 5. In this manner, tampering with the bracket 5 is prevented. The front of the bracket 5 is covered up by the front of the monitor where the vent holes are located. The sides of the bracket 5 are protected by the side walls 11 and 15 as stated above. The back of the bracket is covered up by the removable back portion 7. Without unlocking the key 25, the monitor 3 can not be removed from the bracket. In this manner, theft of the monitor 3 is prevented.

While a particular embodiment has be described above, various modification can be made. Velcro attachments 27, which are attached in any conventional manner such as gluing, can also be attached to the side walls of the monitor 3 so as to cover up the sides of the monitor as well as the back.

It is to be understood that the present invention is not limited to the sole embodiment described above, but encompasses any and all embodiments within the scope of the following claims.

I claim:

1. A video monitor and bracket system for mounting said video monitor within a vehicle, comprising:

a video monitor having a top portion;

a bracket having guide rails; and fastening means for attaching said bracket to an interior portion of a vehicle, wherein said top portion includes means for receiving said guide rails of said bracket so as to attach said video monitor to said bracket and to the interior portion of said vehicle once said bracket is attached to said interior portion.

2. A video monitor and bracket system as claimed in claim 1, wherein said video monitor further includes means for locking said bracket to said top portion of said video monitor so as to prevent theft of said video monitor.

3. A video monitor and bracket system as claimed in claim 2, wherein said means for locking includes a key lock with a pivoting tongue.

4. A video monitor and bracket system as claimed in claim 3, wherein said video monitor includes external connecting means and said bracket includes connector receiving means for receiving said external connecting means of said video monitor for supplying said video monitor with a video signal, an audio signal, and power once said video monitor is attached to said bracket.

5. A video monitor and bracket system for mounting said video monitor within a vehicle, comprising:

a bracket having a rectangular top, left and right downward protruding side walls, left and right opposing rectangular flanges extending inwardly from the bottom edges of said left and right downward protruding side walls, respectively, and fastening means for attaching said bracket to an interior portion of a vehicle;

a monitor having a front end with a video display located thereon a right side wall, a left side wall, a bottom portion, a back open end, and a top portion;

a front portion of said top portion of said monitor being connected to said front end of said monitor;

a left side edge of said top portion of said monitor being located adjacent to said left side wall of said monitor and having a left side gap located therebetween;

a right side edge of said top portion of said monitor being located adjacent to said right side wall of said monitor and having a right side gap located therebetween;

a back portion of said top portion of said monitor having a downward protruding back wall portion extending from a back edge thereof a predetermined distance down from said rectangular top;

left and right extensions extending from said downward protruding back wall portion to attach to said left and right side walls of said monitor, respectively; and, left and right notches located between said back edge of said top portion of said monitor and said left and right extensions so as to allow said left and right extensions and said back edge of said top portion of said monitor, respectively, thereby allowing said left and right opposing rectangular flanges to engage an underneath side of said top portion of said monitor so as to suspend said monitor so as to suspend said monitor within the interior portion of a vehicle when said bracket is attached thereto.

6. A video monitor and bracket system as claimed in claim 5, further comprising:

a recessed portion located in the middle of said back wall portion of said top portion of said monitor;

external connector extensions located within said recessed portion;

connector receiving means located at a back portion of said bracket for receiving said external connector extensions as said bracket is slid onto said top portion of said monitor, thereby supply a video signal, an audio signal, and power to said monitor.

7. A video monitor and bracket system as claimed in claim 6, further including a back portion having means for attaching said back portion to said bracket and means for attaching said back portion over said back open end of said monitor.

8. A video monitor and bracket system as claimed in claim 7, further including a key lock located on said back portion having a rotatable bolt portion for engaging a notch located on said top portion of said monitor once said bracket is placed thereover, wherein said left and right side walls of said monitor extend beyond said top portion of said monitor so as to prevent access to said bracket once said back portion is attached to said back open end with said bracket attached to said top portion of said monitor.

* * * * *